UNITED STATES PATENT OFFICE.

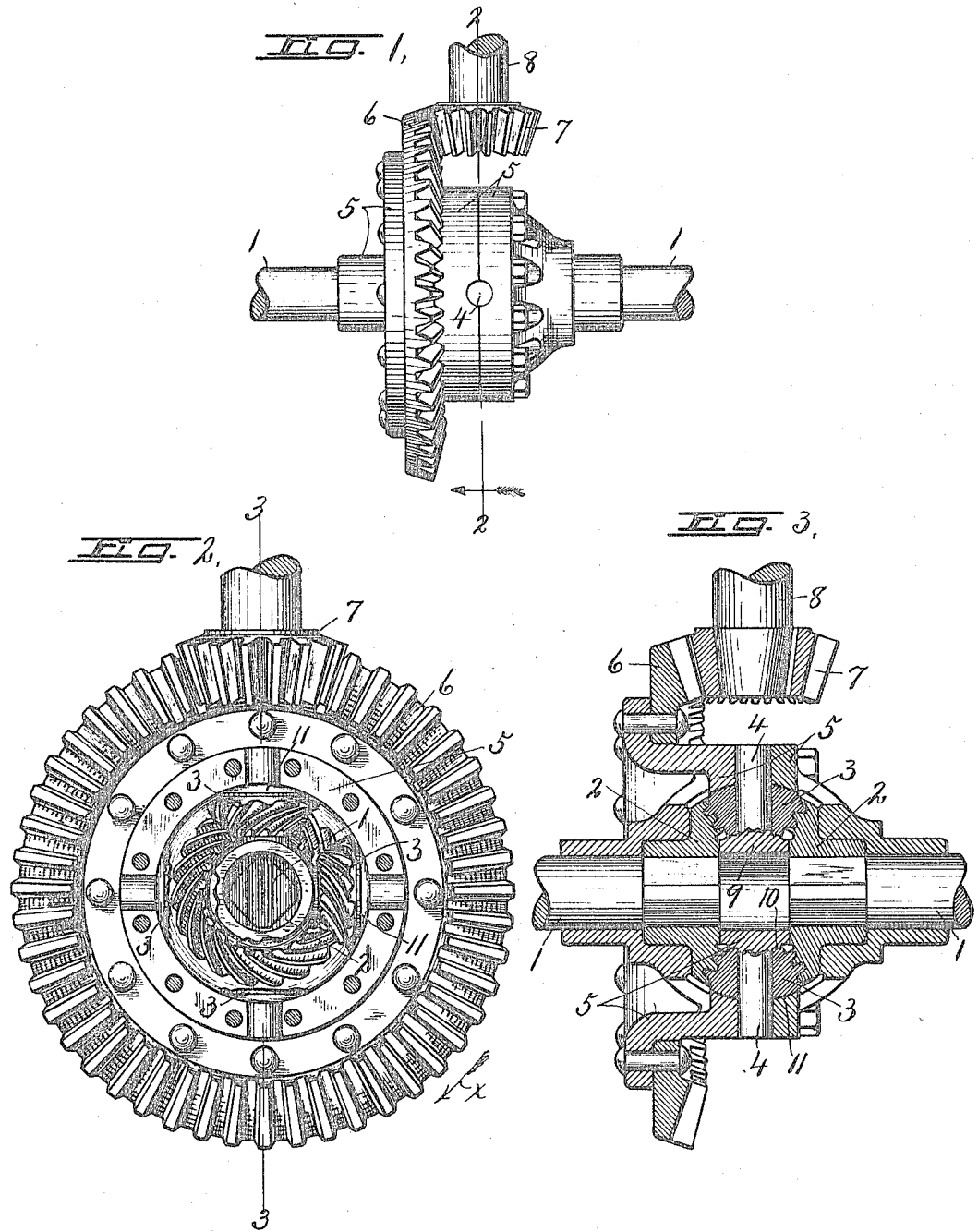

CHARLES HAYES LOGUE, OF SYRACUSE, NEW YORK.

DIFFERENTIAL GEARING.

1,248,687.  Specification of Letters Patent.  Patented Dec. 4, 1917.

Application filed November 21, 1914. Serial No. 873,417.

*To all whom it may concern:*

Be it known that I, CHARLES H. LOGUE, a citizen of the United States of America, and resident of Syracuse, in the county of Onondaga, in the State of New York, have invented new and useful Improvements in Differential Gearing, of which the following, taken in connection with the accompanying drawings, is a full, clear, and exact description.

This invention relates to certain improvements in differential gearing as applied more particularly to the driving connections between the engine and axle sections of the traction wheels of motor-driven vehicles to compensate for the difference in travel of such wheels in turning corners or when the wheels are of different diameters.

In the operation of machines of this character, it frequently happens that the traction of one or the other of the driving wheels is considerably reduced by contact with wet, muddy or icy pavements, resulting in the slipping or spinning of such wheel, and consequent failure to propel the machine.

The main object of my present invention is to provide a simple, practical and efficient device having all the advantages of the ordinary differential with the additional advantage of retarding the independent rotation of the slipping wheel and thereby transmitting greater power to the other traction wheel for propelling the machine.

In other words, I have sought to overcome this objectionable slipping or spinning of either traction wheel independently of the other without increasing the number of parts or materially adding to the cost of production of the differential gearing.

Other objects and uses will be brought out in the following description.

In the drawings—

Figure 1 is a top plan of my improved differential and adjacent portions of the axle of the traction wheel, together with the driving means therefor.

Fig. 2 is a transverse sectional view taken on line 2—2, Fig. 1.

Fig. 3 is a longitudinal sectional view taken in the plane of line 3—3, Fig. 2.

In order that my invention may be clearly understood, I have shown portions of co-axial axle sections —1— adapted to receive and support the usual traction wheels, not shown, said axle sections being arranged end to end, preferably in spaced relation, and are provided near their meeting ends with a pair of similar gears —2— keyed or otherwise secured thereto to rotate therewith.

These gears are, therefore, co-axial and are arranged in spaced relation to receive between them one or more radial pinions —3— which, for balancing purposes, are preferably arranged in pairs to engage diametrically opposite faces of the gears —2—.

These pinions are journaled upon radial studs —4— which in turn are mounted in a revoluble connecting yoke or gear case —5— so as to cause the pinions to move bodily or in a planetary motion about the axis of the axles —1— for transmitting rotary motion to both wheels simultaneously when the traction is substantially equal. The yoke or gear case —5— may be driven by any suitable motive power, and, for this purpose, is provided with a relatively large bevel gear —6— meshing with a relatively small pinion —7— on the adjacent end of a driving shaft —8—, the latter being adapted to be connected in any well-known manner to an engine or other motor, not shown, carried by the vehicle, as the impelling power therefor.

The gears —2— and pinions —3— are preferably cone-shape with their apexes merging at the point of intersection of their axes, the gears —2— being provided with oppositely inclined spiral teeth or threads which may be either right or left-hand. The pinions —3— are also provided with similarly inclined or spiral teeth, except that they must be cut in an opposite direction from that of the gears —2— in order to establish perfect mesh therewith. Each pinion constitutes what may be termed a conical worm, the teeth of which incline outwardly at an angle of between 30° and 60° relatively to its axis, the teeth of the gears —2— having a similar inclination with reference to the radii passing therethrough.

The inner ends of the studs or journal bearings —4— are connected by a ring —9— forming a part of the yoke —5— and providing means whereby the portions of the yoke at the inner and outer ends of each pinion may be formed with end thrust bearings —10— and —11—.

The inclined or spiral teeth of the gears and pinions constitute the basic feature of my invention, in that the bodily rotation of the pinions produced by the rotation of the yoke —5— through the medium of the driving gears —6— and —7— not only effects a positive drive of both axles and the corresponding traction wheels and compensates for the difference in travel of the wheels when the traction of both wheels is substantially equal, but also produces an end thrust of the pinions in one direction or the other against the corresponding bearing in case the traction of either wheel should be lost by slipping, while the traction of the other wheel remains normal, the direction of thrust depending upon which wheel has lost its traction.

In this instance, the threads of the worms or pinions are right-hand, while those of the gears are left-hand, and, therefore, if the yoke or gear case —5— is driven in the direction indicated by arrow —x—, Fig. 2, for forward propulsion of the vehicle and the traction of the right-hand wheel is lost, the effect would be to thrust the pinions outwardly with considerable force against the bearings —11—, thus producing sufficient friction to retard the rolling action of the pinions around the then stationary gear corresponding to the other traction wheel which is in gripping engagement with the pavement and at rest, while at the same time the pinions are carried bodily about the axis of the gears by the continued rotation of the yoke or gear case —5— which, together with the retarded rolling action of the pinions, must of necessity transmit increased power to the gripping wheel tending to propel the vehicle.

In other words, the friction produced by the outward thrust of the pinions against the bearings —11— serves as a break to retard the rotation of the pinions and thereby retard the rotation of the slipping wheel, which, in turn, applies increased driving power to the gripping wheel with the result that the machine may, in most instances, be propelled from its stalled position in case such wheel should slip.

On the other hand, if the traction of the left-hand wheel should be lost and that of the right-hand wheel should be maintained, the pinions would be forced in the reverse direction or inwardly into frictional engagement with the inner bearings —10— with the same result in retarding the rotary action of said pinions and also of the slipping wheel.

These effects may be better understood by considering each pinion as a lever with the teeth at diametrically opposite sides thereof engaging oppositely inclined planes on the gears, and remembering that the side of the pinion engaged with the gear corresponding to the slipping wheel tends to rotate in the same direction as said wheel, due to the bodily movement of the pinion about the axis of the gears, and that the diametrically opposite side of the pinion, therefore, tends to move in the opposite direction, but by reason of the fact that it is engaged with the then stationary gear, the pinion can only roll around the teeth of said stationary gear.

Now assuming that the traction of the right-hand wheel is lost, while that of the other wheel is maintained, then the bodily movement of the pinion, due to the rotation of the yoke or gear case —5— causes the right-hand side of the pinion to travel forwardly against the upper face of the forwardly inclined teeth of the corresponding gear, while the teeth on the left-hand side of the pinion, which is then moving rearwardly, rides along the upper face of the rearwardly declining teeth of the adjacent gear, the effect of which is to thrust the pinion axially against the outer bearing —11— with sufficient friction to retard the independent rotation of said pinion and thereby retard the rotation of the slipping wheel, resulting in the driving of the gear corresponding to the wheel under traction.

In case the other wheel should slip, the reverse action of the pinions would take place with a similar result, thus rendering the retarding operation effective for both wheels without in any way interfering with the free differential action or straight drive.

Another important feature of advantage in the use of these inclined or spiral teeth is that they afford greater areas of contact and maximum degree of strength by reason of their approximately tangential extension.

It is to be understood, however, that the invention is not limited to the use of cone gears or worms for the reason that similar effects may be produced with coöperative inclined teeth on the gears and pinions whether conical or otherwise and, therefore, I do not limit myself to the precise construction shown and described.

What I claim is:

1. In a differential gearing for motor-driven vehicles, a pair of co-axial gears having oppositely inclined teeth, a pinion rotatable about an axis radial to that of the gears and having similarly inclined teeth meshing with both gears, and motor-driven means for moving the pinion bodily about the axis of said gears.

2. In a differential gearing for motor-driven vehicles, the combination of a pair of co-axial bevel gears having their teeth inclined in opposite directions relatively to radii passing therethrough, a yoke revoluble about the axis of the gears, and a pinion journaled on the yoke and provided with similarly inclined teeth meshing with said gears.

3. A differential gearing comprising a pair of co-axial independently revoluble cone gears having reversely inclining spiral teeth, a yoke revoluble about the axis of the gears, and a radially disposed spiral gear carried by the yoke and meshing with said gears.

4. In a differential gearing for motor-driven vehicles, a pair of coaxial gears having circumferentially inclined teeth, a pinion rotatable about an axis radial to that of the gears and provided with circumferentially inclined teeth meshing with the teeth of the gears, and means for moving the pinion bodily about the axis of said gears.

5. A differential gearing comprising two relatively rotatable coaxial members and a rotary driving element therefor co-axial therewith and provided with an abutment, in combination with means for transmitting rotary motion from the driving element to said members including a rotary member mounted on the driving member radial thereto, and means actuated by the rotation of either of the first-named members while the other of said first-named members is at rest for forcing the second-named rotary member axially into frictional engagement with the abutment.

In witness whereof, I affix my signature in the presence of two witnesses.

CHARLES HAYES LOGUE.

Witnesses:
JAMES D. MONAHAN,
FREDERICK W. HEITRICH.